United States Patent [19]

Jinnai

[11] Patent Number: 5,784,173
[45] Date of Patent: Jul. 21, 1998

[54] IMAGE PROCESSING APPARATUS HAVING IMAGE FILING FUNCTION

[75] Inventor: Shigeru Jinnai, Kawasaki, Japan

[73] Assignee: Canon Kabushiki Kaisha, Tokyo, Japan

[21] Appl. No.: 615,046

[22] Filed: Mar. 12, 1996

[30] Foreign Application Priority Data

Mar. 17, 1995 [JP] Japan ................................ 7-059127

[51] Int. Cl.$^6$ ....................................... H04N 1/387
[52] U.S. Cl. ............... 358/403; 358/441; 358/448; 395/117
[58] Field of Search .................. 395/114–117; 358/406, 358/467, 401, 403, 441–444, 448–453, 501, 524, 530, 537, 538, 540

[56] References Cited

U.S. PATENT DOCUMENTS

| | | |
|---|---|---|
| 5,130,806 | 7/1992 | Reed et al. ........................ 358/296 |
| 5,175,735 | 12/1992 | Dahlby et al. .................... 395/181 |
| 5,222,157 | 6/1993 | Yoneda et al. .................... 382/306 |
| 5,450,571 | 9/1995 | Rosekrans et al. ................ 395/500 |
| 5,500,715 | 3/1996 | Ta et al. ........................... 399/1 |
| 5,517,316 | 5/1996 | Hube ................................ 358/296 |
| 5,629,980 | 5/1997 | Stefik et al. ...................... 380/4 |

Primary Examiner—Matthew M. Kim
Assistant Examiner—U. Chauhan
Attorney, Agent, or Firm—Fitzpatrick, Cella, Harper & Scinto

[57] ABSTRACT

A target image to be retrieved and a processing mode of the target image are stored in a magneto-optic disk as a job in a job file by using a computer which is independent of an image processing apparatus. The magneto-optic disk is set into the image processing apparatus. When the magneto-optic disk is set, whether or not the job file is stored in the disk is detected. When the job file is stored, whether or not a job including a processing mode which cannot be executed by the image processing apparatus exists in the job file is discriminated. When a job cannot be executed, such fact is displayed and execution of the job is skipped.

32 Claims, 9 Drawing Sheets

⟨JOB DISPLAY⟩

THE NUMBER OF REGISTERED JOB : 3    THE NUMBER OF NON-PROCESSED JOB : 3

| JOB NO. | DOCUMENT NUMBER | DOCUMENT NAME | THE NUMBER OF PAGES | PAGE RANGE | THE NUMBER OF COPIES | PAPER SIZE | DIRECTION OF PAPER | TWO-SIDED | SORT | STAPLE | REGISTERED DATE/TIME | EXECUTION DATE/TIME | STATUS |
|---|---|---|---|---|---|---|---|---|---|---|---|---|---|
| 1 | 3 | MINUTE | 10 | 1-10 | 5 | AUTOMATIC | AUTOMATIC | SELECT | SELECT | SELECT | '93-3-25 10:00 | — | NON-PROCESSED |
| 2 | 4 | LIST | 5 | 1-1 | 2 | AUTOMATIC | AUTOMATIC | NOT SELECT | SELECT | SELECT | '93-3-25 10:03 | — | NON-PROCESSED |
| 3 | 7 | CATALOG | 1 | 1-1 | 1 | AUTOMATIC | AUTOMATIC | NOT SELECT | SELECT | NOT SELECT | '93-3-25 10:04 | — | NON-PROCESSED |
| ⋮ | ⋮ | ⋮ | ⋮ | ⋮ | ⋮ | ⋮ | ⋮ | ⋮ | ⋮ | ⋮ | ⋮ | ⋮ | ⋮ |

[ CHANGE ]   [ OK ]

| THE NUMBER OF JOBS | |
|---|---|
| TRANSMITTING SIDE | PARAMETER |
| TRANSMITTED SIDE | PARAMETER |
| ... | ... |
| TRANSMITTING SIDE | PARAMETER |
| TRANSMITTED SIDE | PARAMETER |

FIG. 8

DOCUMENT NUMBER : 3    DOCUMENT NAME : MINUTE    THE NUMBER OF PAGES : 10

<PLEASE DESIGNATE PROCESS MODE>

THE NUMBER
OF COPIES

THE NUMBER OF PAGES  ⦿ ALL PAGES
                     ○ PAGE [ ] TO PAGE [ ]

PAPER SIZE  ⦿ AUTOMATIC
            ○ [ A4 ]

TWO-SIDED PRINT  ⦿ SELECT
                 ○ NOT SELECT

SORT    ⦿ SELECT
        ○ NOT SELECT

STAPLE  ⦿ SELECT
        ○ NOT SELECT

FIG. 9

<JOB DISPLAY>

THE NUMBER OF REGISTERED JOB : 3        THE NUMBER OF NON-PROCESSED JOB : 3

| JOB NO. | DOCUMENT NUMBER | DOCUMENT NAME | THE NUMBER OF PAGES | PAGE RANGE | THE NUMBER OF COPIES | PAPER SIZE | DIRECTION OF PAPER | TWO-SIDED | SORT | STAPLE | REGISTERED DATE/TIME | EXECUTION DATE/TIME | STATUS |
|---|---|---|---|---|---|---|---|---|---|---|---|---|---|
| 1 | 3 | MINUTE | 10 | 1-10 | 5 | AUTOMATIC | AUTOMATIC | SELECT | SELECT | SELECT | '93-3-25 10:00 | ——— | NON-PROCESSED |
| 2 | 4 | LIST | 5 | 1-1 | 2 | AUTOMATIC | AUTOMATIC | NOT SELECT | SELECT | SELECT | '93-3-25 10:03 | ——— | NON-PROCESSED |
| 3 | 7 | CATALOG | 1 | 1-1 | 1 | AUTOMATIC | AUTOMATIC | NOT SELECT | SELECT | NOT SELECT | '93-3-25 10:04 | ——— | NON-PROCESSED |
| ...... | ...... | ...... | ...... | ...... | ...... | ...... | ...... | ...... | ...... | ...... | ...... | ...... | ...... |

CHANGE    OK

IMAGE PROCESSING APPARATUS HAVING IMAGE FILING FUNCTION

BACKGROUND OF THE INVENTION

1. Field of the Invention

The invention relates to an image processing apparatus having an image filing function for reading out an image stored in a memory medium and performing a process.

2. Related Background Art

Hitherto, there is known an image electronic filing apparatus in which an input image data is stored as files into a memory which electrically stores the image data and manages every file.

The conventional image electronic filing apparatus which is used, for example, in a stand-alone manner or the like is constructed by: a scanner for reading out an original image; a printer for recording and outputting data to a recording paper or the like; a display for visually displaying an image; a controller for controlling each process; a storage device for storing the image data as files; and the like.

In recent years, a compound apparatus has been put into practical use such that a scanner and a printer of a digital copying apparatus are commonly used and, further, a modem or the like is added, thereby using the digital copying apparatus as a facsimile apparatus, or a printer unit of the digital copying apparatus is commonly used and, further, an interface or the like of a computer is added, thereby developing code data from a computer into bit map data and enabling the image data to be printed out.

Such a compound apparatus is further progressing to the realization of a higher additional value in a manner such that a plurality of functions such as a copying function, facsimile function, printer formatting function, image electronic filing function, image memory function, and the like are constructed as one unit as disclosed in U.S. patent application Ser. No. 957,092.

In such a compound apparatus, by commonly using the scanner unit and printer unit, a saving of space, a reduction in costs, an advanced function, and the like are realized.

Further, in a copying apparatus, hitherto, copy output results of an original are sorted or stapled by using a sorter or a staple sorter.

When image data of a desired file is read out from a storage device and is recorded and outputted to a recording paper by a printer, in case of sorting or stapling, by setting an output mode such as sorting or stapling from an operation unit, the image data is outputted in the designated output mode.

However, in case of setting the output mode from the operation unit as mentioned above, while one user is executing the setting operation, another user cannot use the apparatus, so that there is a problem such that the apparatus is used by a single user at a time.

As disclosed in U.S. patent application Ser. No. 528,423, a job file indicative of an image as a processing target and processing contents is formed and stored into a memory medium by using an external storage device connected to a personal computer existing at a position which is removed from a compound image processing apparatus and by inserting the memory medium into the external storage device of the compound image processing apparatus, a desired process is executed for a desired image without performing any complicated operation by an operation unit.

However, since processing modes of jobs are set at a position removed from the compound image processing apparatus, there is a possibility that a processing mode which cannot be executed by the compound image processing apparatus is included in the processing modes of jobs which are set.

In the above application, no consideration is made with respect to a job including a processing mode which cannot be executed.

SUMMARY OF THE INVENTION

It is an object of the invention to provide an image processing method and its control method, in which the foregoing drawbacks are eliminated.

Another object of the invention is to provide an image processing apparatus and its control method, in which even a job including an unexecutable processing mode exists in a job file, by notifying the existence of the unexecutable job and by executing another job, an entire process is smoothly progressed.

Still another object of the invention is to provide an image processing apparatus and its control method, in which by deleting from a job file a job whose execution is finished and by inhibiting that a job having an unexecutable processing mode is deleted from a job file, it is possible to prevent a situation such that the job excluding the unexecutable processing mode is executed and this job is deleted from the job file.

The above and other objects and features of the present invention will become apparent from the following detailed description and the appended claims with reference to the accompanying drawings.

BRIEF DESCRIPTION OF THE DRAWINGS

FIG. 8 is a diagram showing a set picture plane of a processing mode of a job;

FIG. 9 is a diagram showing a job file; and

DETAILED DESCRIPTION OF THE PREFERRED EMBODIMENTS

Figure 1:
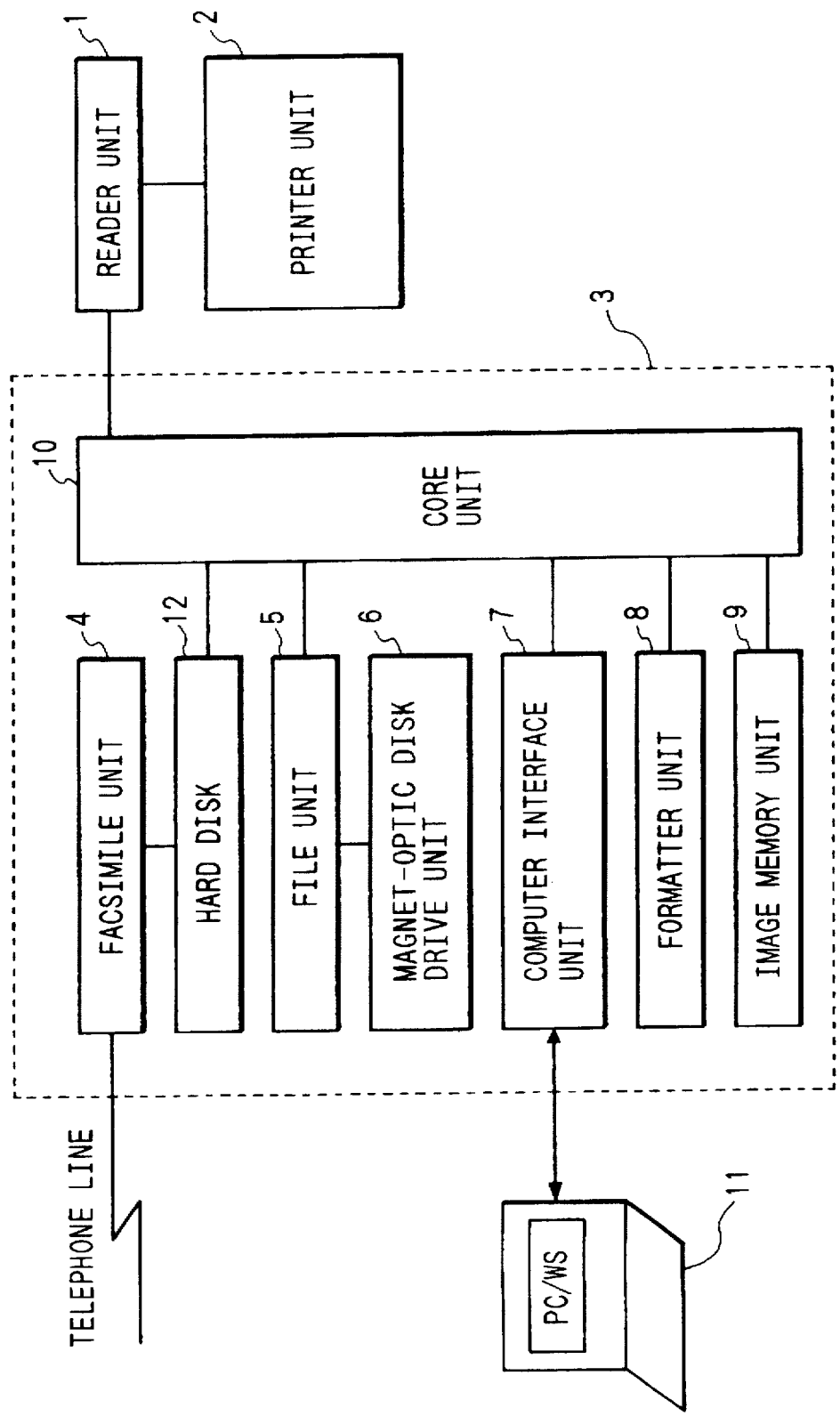
FIG. 1 is a block diagram of a compound image processing apparatus according to the invention.

FIG. 1 is a block diagram for describing a construction of a compound image processing system showing an embodiment of the invention.

In the diagram, a reader unit 1 reads an image of an original and outputs image data corresponding to the original image to a printer unit 2 and an image input/output (I/O) control unit 3. The printer unit 2 records on a recording paper an image corresponding to the image data read from the reader unit 1 and image I/O control unit 3.

The image I/O control unit 3 is connected to the reader unit 1 and is constructed by: a facsimile unit 4; a file unit 5; a computer interface unit 7; a formatter unit 8; an image memory unit 9; a core unit 10; and the like.

The facsimile unit 4 expands the compression image data which is received through a telephone line and transfers the expanded image data to the core unit 10. The facsimile unit 4 also compresses the image data transmitted from the core unit 10 and transmits the compressed compression image data through the telephone line. A hard disk (HD) 12 is connected to the facsimile unit 4 for temporarily holding the received compression image data.

A magneto-optic disk drive unit 6 is connected to the file unit 5. The file unit 5 compresses the image data transferred from the core unit 10 and stores the compression image data together with a key word to retrieve the image data to a magneto-optic disk set in the drive unit 6.

The file unit 5 retrieves the compression image data stored on the magneto-optic disk on the basis of the key word which is transferred through the core unit 10, reads out and expands the retrieved compression image data, and transfers the expanded image data to the core unit 10. The computer I/F unit 7 is an interface between a personal computer or workstation (PC/WS) 11 and the core unit 10.

The formatter unit 8 develops the code data indicative of the image transferred from the PC/WS 11 into the image data which is recorded by the printer unit 2. The image memory unit 9 temporarily stores the data transferred from the PC/WS 11. Although the core unit 10 is described in detail hereinlater, the core unit 10 controls a flow of data between the reader unit 1, facsimile unit 4, file unit 5, computer I/F unit 7, formatter unit 8, and image memory unit 9.

The PC/WS 11 is an information processing apparatus (information processing terminal) constructed by a personal computer or a workstation and is constructed so that it communicates with the core unit 10 through the computer I/F unit 7.

Figure 2:
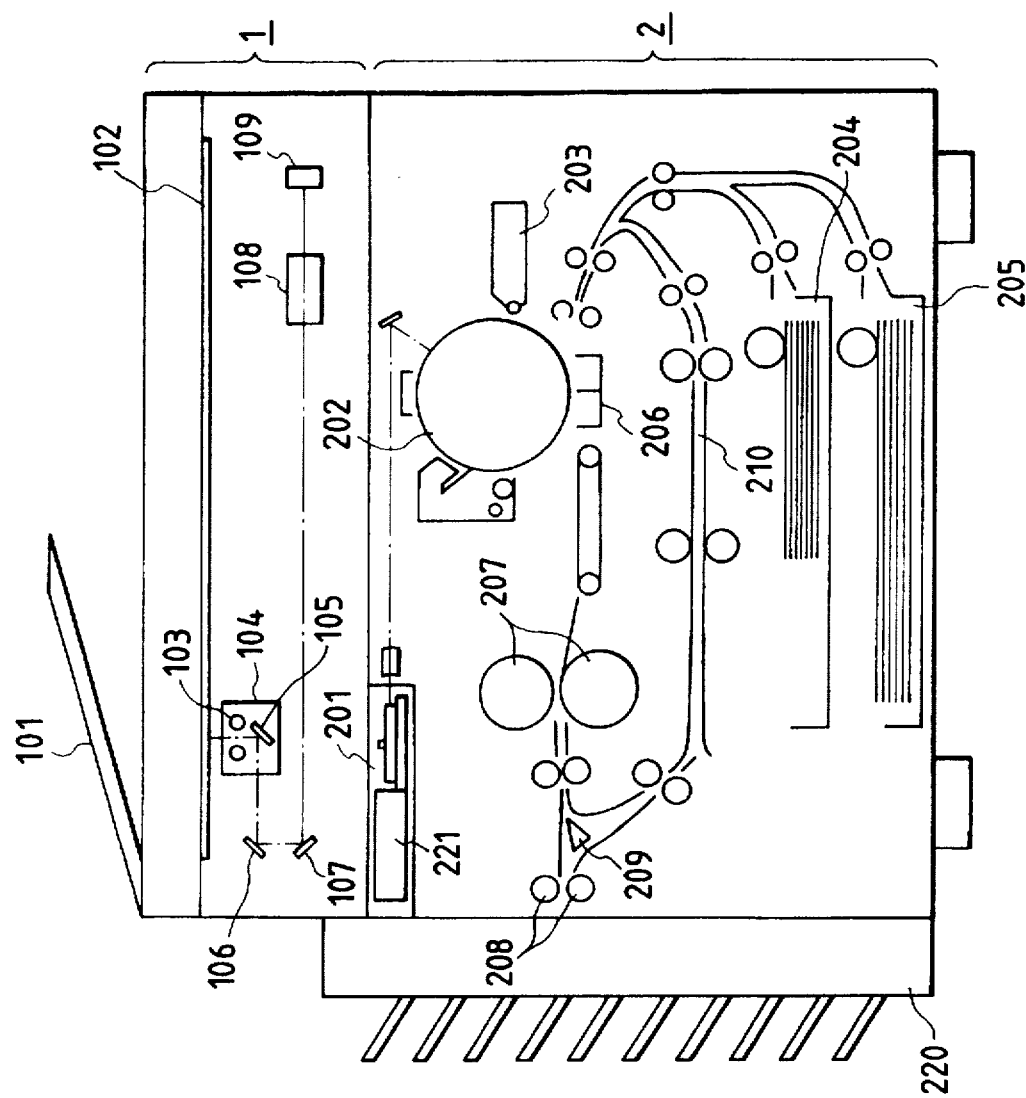
FIG. 2 is a schematic cross sectional view of a reader unit 1 and a printer unit 2 shown in FIG. 1.

FIG. 2 is a cross sectional view for describing a construction of the reader unit 1 and printer unit 2 shown in FIG. 1.

In the diagram, a document feeder 101 of the reader unit 1 sequentially feeds originals one by one from the last page onto a platen glass 102. After completion of the reading operation of the originals, the document feeder 101 ejects the original on the platen glass 102. When the original is fed onto the platen glass 102, a lamp 103 is lit on and the movement of a scanner unit 104 is started, thereby exposing and scanning the original. A reflection light from the original in this instance is reflected by mirrors 105, 106, and 107 and is provided to a CCD image sensor (hereinafter, abbreviated to a CCD) 109 through a lens 108. As mentioned above, the image of the original which is scanned is read by the CCD 109. The image data which is generated from the CCD 109 is subjected to predetermined processes and, after that, is transferred to the printer unit 2 and the core unit 10 of the image I/O control unit 3.

A laser driver 221 of the printer unit 2 drives a laser emitting unit 201 so as to emit a laser beam according to the image data generated by the reader unit 1. The laser beam is irradiated on a photosensitive drum 202, so that a latent image according to the laser beam is formed on the photosensitive drum 202. A developing agent is adhered onto the portion of the latent image of the photosensitive drum 202 by a developing unit 203.

A recording paper is fed from either one of a cassette 204 or 205 at a timing synchronized with the start of the irradiation of the laser beam and is conveyed to a transfer unit 206. The developing agent adhered to the photosensitive drum 202 is transferred onto the recording paper. The recording paper on which the developing agent is adhered is conveyed to a fixing unit 207 and the developing agent is fixed onto the recording paper by heat and pressure by the fixing unit 207. The recording paper which passed through the fixing unit 207 is ejected by an ejection roller 208. A sorter 220 provides the ejected recording papers to respective bins, thereby sorting the recording papers. In the case where a sorting mode is not set, the sorter 220 provides the recording papers onto the top bin. When a two-sided recording mode is set, the recording paper is conveyed to the ejection roller 208 and, after that, the rotating direction of the ejection roller 208 is reversely rotated and the recording paper is guided to a refeed conveying path by a flapper 209.

When a multiplex recording mode is set, the recording paper is guided to the refeed conveying path by the flapper 209 so as not to be conveyed to the ejection roller 208. The recording paper which was conveyed to the refeed conveying path is fed to the transfer unit 206 at the foregoing timing.

Figure 3:
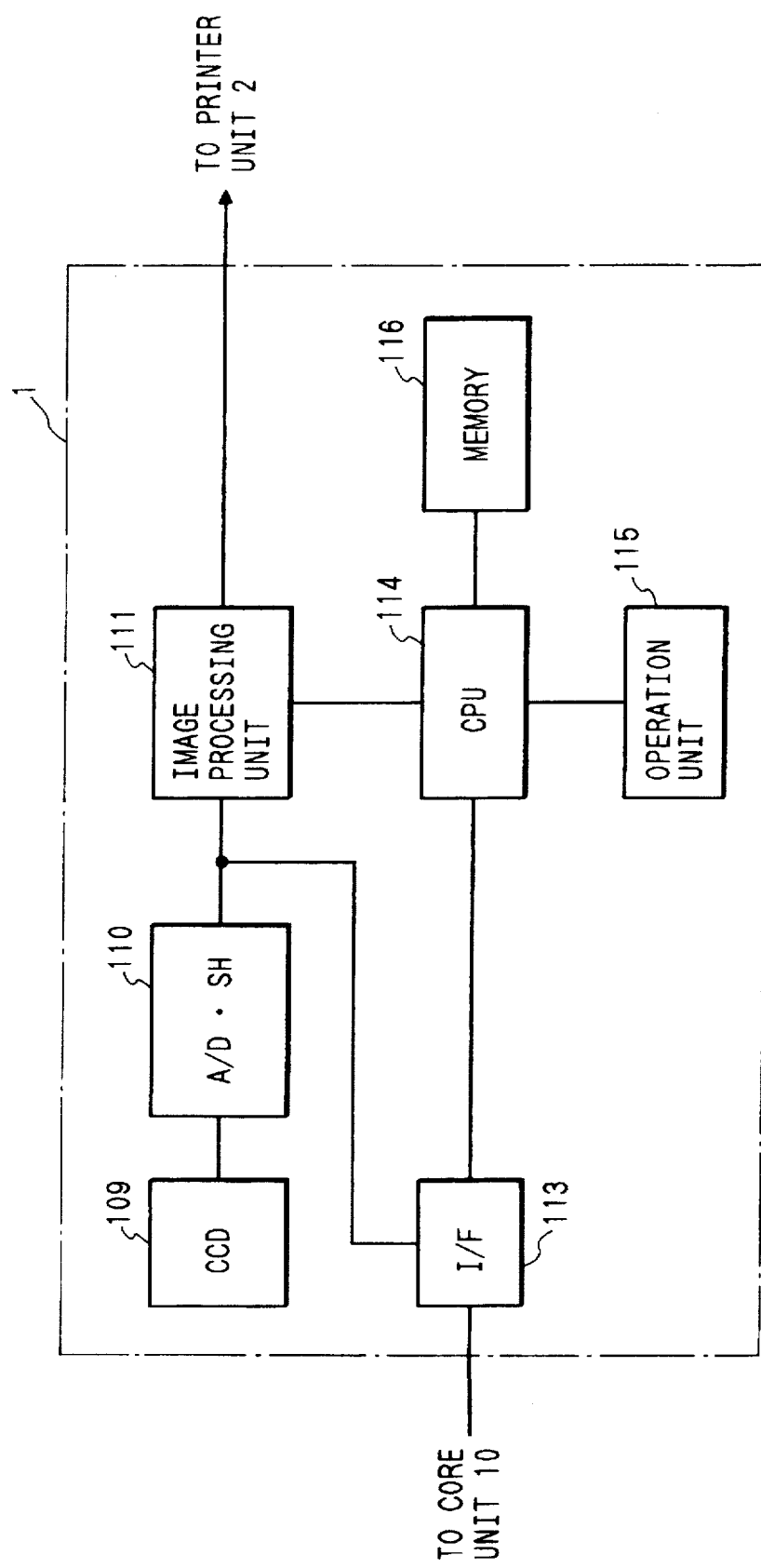
FIG. 3 is a schematic block diagram of the image processing construction of the reader unit 1 shown in FIG. 1.

FIG. 3 is a schematic block diagram for describing an image processing construction of the reader unit 1 shown in FIG. 1.

In the diagram, the image data outputted from the CCD 109 is analog/digital converted by an A/D•SH unit 110 and is also subjected to a shading correction. The image data processed by the A/D•SH unit 110 is transferred to the printer unit 2 through an image processing unit 111. The image data is also transferred to the core unit 10 of the image I/O control unit 3 through an interface unit 113. A CPU 114 controls the image processing unit 111 and interface 113 in accordance with set contents which are set by an operation unit 115. For example, in the case where a copy mode is set in which a trimming process is executed by the operation unit 115 and an image is copied, the image processing unit 111 is allowed to execute a trimming process and to transfer the processed image data to the printer unit 2. When a facsimile transmitting mode is set by the operation unit 115, a control command according to the image data and the mode which is set is transferred from the interface 113 to the core unit 10. Such a control program of the CPU 114 is stored in a memory 116. The CPU 114 executes a control with reference to the memory 116. The memory 116 is also used as a work area of the CPU 114.

Figure 4:
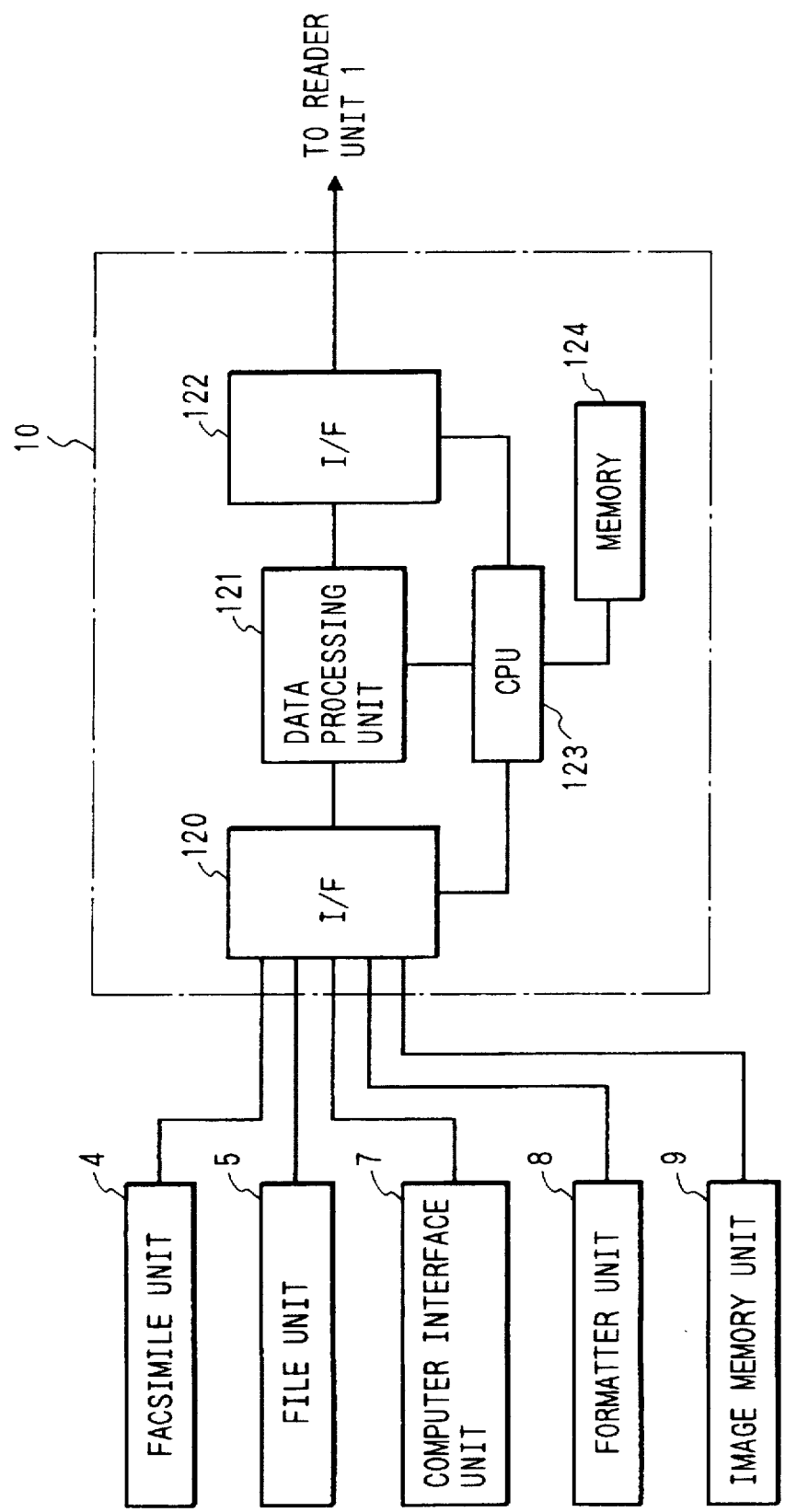
FIG. 4 is a block diagram of the construction of a core unit 10 shown in FIG. 1.

FIG. 4 is a block diagram for describing a construction of the core unit 10 shown in FIG. 1. In the diagram, the same portions as those in FIG. 1 are designated by the same reference numerals.

In the diagram, the image data from the reader unit 1 is transferred to a data processing unit 121. A control command from the reader unit 1 is transferred to a CPU 123. The data processing unit 121 executes a rotating process of an image and image processes such as a zooming process and the like. The image data transferred from the reader unit 1 to the data processing unit 121 is transferred from the reader unit 1 to the facsimile unit 4, file unit 5, and computer I/F unit 7 through an interface 120 in accordance with the control command transmitted from the reader unit 1. Code data indicative of the image inputted through the computer I/F unit 7 is transferred to the data processing unit 121. After that, it is sent to the formatter unit 8 and is developed into the image data. The image data is supplied to the data processing unit 121. After that, the image data is transferred to the facsimile unit 4 and printer unit 2.

After the image data from the facsimile unit 4 is transferred to the data processing unit 121, it is sent to the printer unit 2, file unit 5, or computer I/F unit 7. The image data from the file unit 5 is supplied to the data processing unit 121. After that, it is transferred to the printer unit 2, facsimile unit 4, or computer I/F unit 7. The CPU 123 executes such control in accordance with the control program stored in a memory 124 and the control command transferred from the reader unit 1. The memory 124 is also used as a work area of the CPU 123. As mentioned above, processes in which functions such as reading of the original image, printing of the image, transmission and reception of the image, storage of the image, input and output of the data from the computer, and the like are combined are executed with the core unit 10 as a center.

A file processing method of a compound image processing apparatus according to the invention is described hereinbelow with reference to FIGS. 5 to 7.

Figures 5, 6:
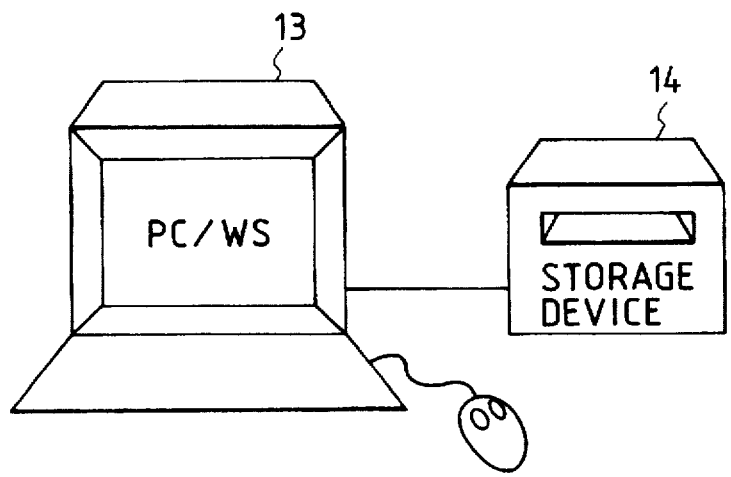
FIG. 5 is a schematic diagram of a computer and a storage device.
FIG. 6 is a diagram of a job designation file which is formed by the computer 13 shown in FIG. 5.

FIG. 5 is a schematic diagram for describing a construction of a PC/WS (personal computer or workstation) 13 and a storage device 14 which are independent on the image processing apparatus shown in FIG. 1. The PC/WS 13 differs from the PC/WS 11 in FIG. 1. However, in the case where the apparatus is constructed in a manner such that no image is transmitted from the PC/WS 11 to the core unit 10 through the computer I/F unit 7, the PC/WS 11 is also used as a PC/WS 13.

The storage unit 14 can also use the magneto-optic disk which is set in the magneto-optic disk drive unit 7 shown in FIG. 1. The PC/WS 13 has a function for retrieving an image file stored in the magneto-optic disk that is set into the storage device 14 and a function for storing a job file to the magneto-optic disk.

FIG. 6 is a diagram for describing a structure of a job designation file which is formed by the PC/WS 13 shown in FIG. 5.

As shown in the diagram, the job designation file is constructed by setting a parameter indicative of a transmitting side and a parameter indicative of a transmitted side to one set. The job designation file designates and forms a document by retrieving by the PC/WS 13 or forms a document by using a text editor or the like.

A processing method using an image output job file as a characteristic part of the invention is described below.

The image data which was previously read from the reader 1 is stored to the magneto-optic disk in an external storage device 6. After completion of the storage, the magneto-optic disk is ejected from the external storage device 6 and is held at a proper position.

A case where an image stored on the magneto-optic disk is outputted by using a job file is described below.

Figure 7:
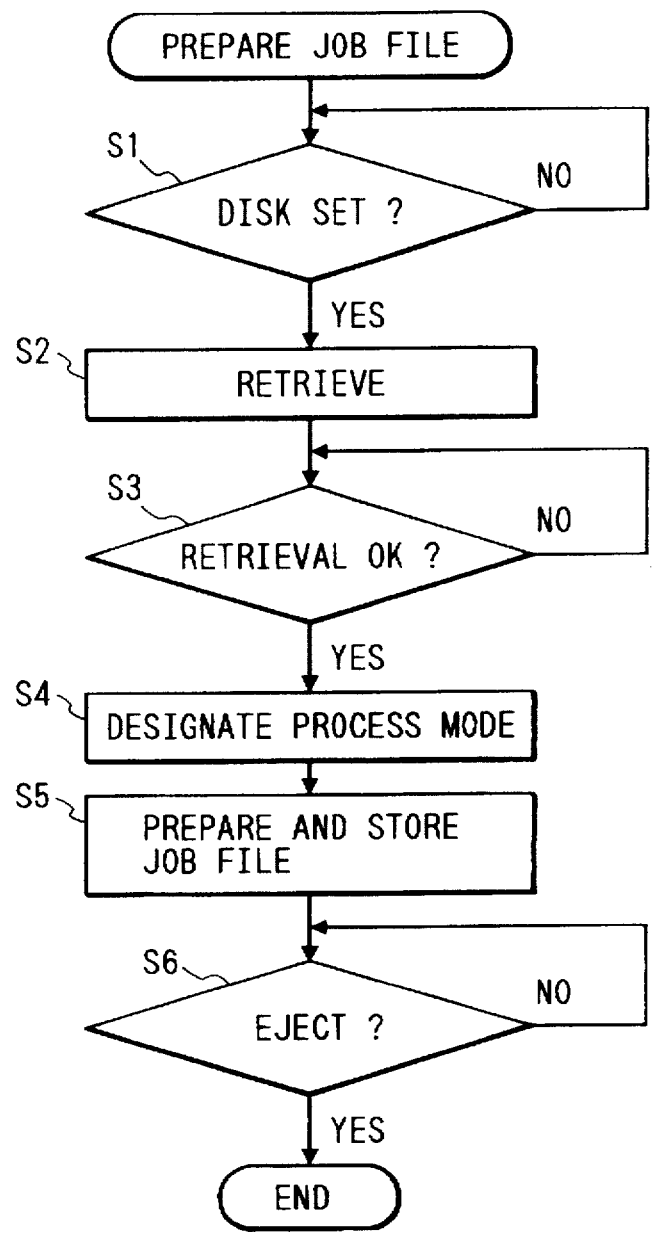
FIG. 7 is a flowchart showing a forming process of a job file.

FIG. 7 is a flowchart showing processes in the case of forming a job file.

First, the magneto-optic disk is inserted into the external storage device 14 connected to the computer 13 in FIG. 5 (step S1). A data base file formed on the magneto-optic disk is read from an application software, thereby retrieving a desired image file (S2).

When a desired image file is found (S3), for example, as shown in FIG. 8, a processing mode is designated (S4). As processing modes, for instance, the number of output copies, the number of output pages, an output paper size, a two-sided output, a sort output, a staple, and the like can be designated. Those processing modes are stored as output job files in a predetermined area of the magneto-optic disk together with unique file numbers to specify the image file (S5). The processing modes are not limited to those mentioned above, and may be various other image processes.

FIG. 9 is an explanatory diagram showing an example of contents of a job designation file. As shown in the diagram, a plurality of jobs are registered. A deletion, an addition, and the like of the job contents can also be changed.

After completion of the registration of a desired job, the magneto-optic disk is ejected from the external storage device 14 (S6).

As described above, the registration of the job is set on a magneto-optic disk unit basis.

Figure 10:
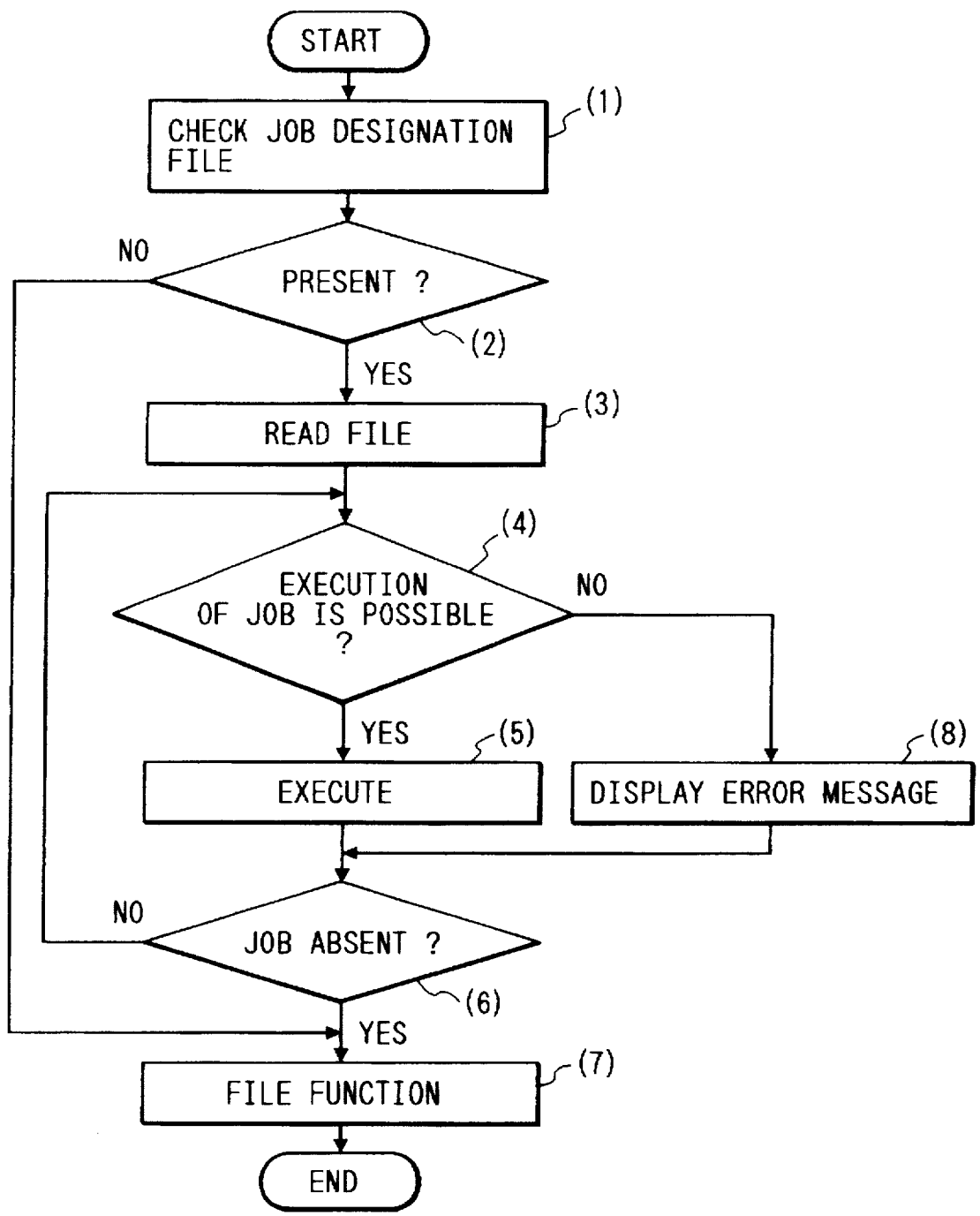
FIG. 10 is a flowchart showing a file processing method of a compound image processing apparatus according to the invention.

FIG. 10 is a flowchart showing an embodiment of a file processing method of the compound image processing apparatus according to the invention. Reference numerals (1) to (8) denote processing steps.

When the magneto-optic disk is set into the unit 6, the file unit 5 discriminates whether a job designation file is stored in the magneto-optic disk. In step (2), when there is a job file, the processing routine advances to step (3) and the file is read.

In step (4), a check is made to see if the processing mode included in the job designated in the job file can be executed by the function provided for the compound image processing apparatus. If YES, step (5) follows and the job is executed. The file unit 5 deletes the executed job from the job file of the magneto-optic disk. The deleting process can be either one of logical deletion or physical deletion. The job deletion can also be performed before the magneto-optic disk is ejected.

In step (6), a check is made to see if all of the jobs have been executed. The processes in steps (4) to (6) are repeated until all of the jobs are executed.

When the job designation file doesn't exist in step (2), after all of the jobs are executed, the user executes a file function to instruct from the operation unit (7).

When the job including the unexecutable processing mode exists in step (4), the number of unexecutable jobs, a document name of the image, and the like are displayed to the operation unit 115 of the reader unit 1. A factor of the unexecutable processing mode is also displayed, namely, which processing mode in the job cannot be executed. The next job is also similarly discriminated.

For example, in the case where a stapling process is included in the job and the printer unit 2 doesn't have a stapling function, it is judged that the job cannot be executed. Even in the case where a two-sided recording process is included in the job and the printer unit 2 doesn't have a two-sided recording function, it is also judged that the job cannot be executed.

Thus, when there is an unexecutable job, the execution of the job is skipped and the executable jobs are sequentially executed.

When the printer has a password function, it is also possible to construct in a manner such that the apparatus is controlled so as not to execute the job designation file unless a correct password is inputted when the magneto-optic disk is set to the drive unit 6, thereby providing security.

It is also possible to use a job for facsimile communicating an image through the facsimile unit 4 in place of the operation to print the image.

It will be also understood that the invention can also be applied to a case where the invention is accomplished by supplying a program to each apparatus.

The present invention is not limited to the foregoing embodiments, and many modifications and variations are possible within the spirit and scope of the appended claims of the invention.

What is claimed is:

1. A control method of an image processing apparatus, comprising the steps of:

storing a job, as a job file, in a removable memory medium, said job file being constructed by image file data to specify desired image information stored in said memory medium in which image information has previously been stored and a processing mode for said image information specified by the image file data by an apparatus different from said image processing apparatus;

detecting whether said memory medium has been inserted into said image processing apparatus;

reading said job file from said memory medium when said memory medium has been inserted into said image processing apparatus;

discriminating whether or not a job including a processing mode which cannot be executed by said image processing apparatus exists in the job file which is read out;

when there is a job including a processing mode which cannot be executed, informing that said job cannot be executed and skipping an execution of said job; and when there is a job excluding a processing mode which can not be executed, executing said job.

2. A method according to claim 1, wherein in said informing step, a number of the job which cannot be executed and a document name of the image information are displayed.

3. A method according to claim 2, wherein in said informing step, the processing mode which cannot be executed is displayed.

4. A method according to claim 1, further having the step of:

deleting the executed job from the job file stored in said memory medium and inhibiting a deletion of said job which cannot be executed.

5. A method according to claim 1, further having the steps of:

inputting a password and judging a validity of said inputted password; and when the inputted password is valid, permitting the execution of the job in the job file and, when the inputted password is invalid, inhibiting the execution of the job in the job file.

6. A control method of an image processing apparatus, comprising the steps of:

detecting whether or not a removable memory medium has been inserted into said image processing apparatus;

when said memory medium is inserted, detecting whether or not a job file has been stored in said memory medium, in which said job file has at least one job constructed by designation data to designate an image stored in said memory medium and processing mode data indicative of a processing mode for the image that is designated by said designation data;

when the job file has been stored in said memory medium, discriminating whether or not a job including a processing mode which cannot be executed by said image processing apparatus exists in said job file;

when there is a job including a processing mode which cannot be executed, skipping an execution of said job and informing that the execution of the job is skipped; and when there is a job excluding a processing mode which can not be executed, reading out the image from said memory medium in accordance with the designation data included in said job and processing the read-out image in accordance with the processing mode data included in said job.

7. A method according to claim 6, wherein when the job file is not stored in said memory medium, said image processing apparatus sets a file mode for storing the image into said memory medium or retrieving the image from said memory medium.

8. A method according to claim 6, wherein the job file stored in said memory medium is formed by an apparatus different from said image processing apparatus.

9. A method according to claim 6, wherein in said informing step, a number of the job which cannot be executed and a document name of the image which is designated by the designation data included in said job are displayed.

10. A method according to claim 9, wherein in said informing step, a processing mode which cannot be executed is further displayed.

11. A method according to claim 6, further having the step of:

deleting the executed job from the job file stored in said memory medium and inhibiting the deletion of the job which cannot be executed.

12. An image processing apparatus comprising:

a driving apparatus into which a removable memory medium in which a job file formed by an apparatus different from said image processing apparatus has been stored is inserted, in which said job file has at least one job constructed by designation data to designate an image stored in said memory medium and processing mode data indicative of a processing mode for the image which is designated by said designation data;

processing means for executing a process to said image which was read out from said memory medium by said driving apparatus;

detecting means for detecting whether or not said memory medium has been inserted;

discriminating means for discriminating whether or not a job having a processing mode which cannot be processed by said processing means exists in the job file stored in said memory medium in a case where said memory medium has been inserted; and informing means, when there is the job having a processing mode which cannot be processed, for informing that an execution of said job is inhibited, wherein said processing means skips the execution of the job having a processing mode which cannot be executed and executes the process to the image which is designated by said designation data in accordance with the processing mode data included in the job excluding a processing mode which can not be executed.

13. An apparatus according to claim 12, wherein said informing means displays a number of the job which cannot be executed and a document name of the image which is designated by said designation data.

14. An apparatus according to claim 13, wherein said informing means further displays the processing mode which cannot be executed.

15. An apparatus according to claim 12, further having:

deleting means for deleting the job whose execution was finished by said processing means from the job file stored in said memory medium and for inhibiting a deletion of the job which cannot be executed.

16. An image processing apparatus comprising:

a driving apparatus into which a removable memory medium is inserted;

first detecting means for detecting whether or not said memory medium has been inserted into said driving apparatus;

second detecting means for detecting whether or nor a job file has been stored in said memory medium when the memory medium is inserted into said driving apparatus, in which said job file has at least a job constructed by designation data to designate an image stored in said memory medium and processing mode data indicative of a processing mode for the image which is designated by said designation data;

processing means for executing a process to the image which is read out from said memory medium;

discriminating means, when the job file has ben stored in said memory medium, for discriminating whether or not a job including a processing mode which cannot be processed by said processing mode which cannot be processed by said processing means exists in said job file; and informing means, when there is a job including a processing mode which cannot be processed, for informing that an execution of said job is inhibited, wherein said processing means skips the execution of the job including a processing mode which cannot be executed and executes the process to the image which is designated by the designation data in accordance with the processing mode data included in the job excluding a processing mode which can not be executed.

17. An apparatus according to claim 16, wherein said job file is formed by an apparatus different from said image processing apparatus.

18. An apparatus according to claim 16, wherein said informing means displays a number of the job which cannot be executed and a document name of the image which is designated by said designation data.

19. An apparatus according to claim 18, wherein said informing means further displays the processing mode which cannot be executed.

20. An apparatus according to claim 16, further having:

deleting means for deleting the job whose execution was finished by said processing means from the job file stored in said memory medium and for inhibiting a deletion of the job which cannot be executed.

21. A control method of an image recording apparatus comprising the steps of:

inputting a job file from a remote apparatus different from said image recording apparatus, said job file being constructed by a plurality of jobs having designation data to designate an image stored in a memory medium and a processing mode for recording the image designated by the designation data;

discriminating whether or not said image recording apparatus has a necessary structure to execute the processing mode for each job of the input job file;

when there is not the necessary structure to execute the processing mode, skipping an execution of the job having the processing mode and executing other jobs.

22. A method according to claim 21, wherein said processing mode includes a two side recording mode to execute a recording on two sides.

23. A method according to claim 21, wherein processing mode includes a staple mode to staple a plurality of recording sheets to which images have already been recorded.

24. A method according to claim 21, further comprising a step of displaying a processing mode which cannot be executed when said image recording apparatus does not have the necessary structure.

25. An image recording apparatus comprising:

input means for inputting a job file from a remote apparatus different from said image recording apparatus, said job file being constructed by a plurality of jobs having designation data to designate an image stored in a memory medium and a processing mode for recording the image designated by the designation data;

discriminating means for discriminating whether or not said image recording apparatus has a necessary structure to execute the processing mode for each job of the job file inputted by said input means;

control means for, when there is not the necessary structure to execute the processing mode, skipping an execution of the job having the processing mode and executing other jobs.

26. A method according to claim 25, wherein said processing mode includes a two side recording mode to a execute a recording on two sides.

27. A method according to claim 25, wherein said processing mode includes a staple mode to staple a plurality of recording sheets to which images have already been recorded.

28. A method according to claim 25, further comprising a step of displaying a processing mode which cannot be executed when said image recording apparatus does not have the necessary structure.

29. A computer program product for an image recording apparatus, comprising a computer readable medium having computer program code, said product comprising:

inputting process procedure codes for executing a process to input a job file from a remote apparatus different from said image recording apparatus, said job file being constructed by a plurality of jobs having designation data to designate an image stored in a memory medium and a processing mode for recording the image designated by the designation data;

discriminating process procedure codes for discriminating whether or not said image recording apparatus has a necessary structure to execute the processing mode for each job of the job file input in said input process;

controlling process procedure codes for, when there is not the necessary structure to execute the processing mode, skipping an execution of the job having the processing mode and executing other jobs.

30. A method according to claim 29, wherein said processing mode includes a two side recording mode to execute a recording on two sides.

31. A method according to claim 29, wherein said processing mode includes a staple mode to staple a plurality of recording sheets to which images have already been recorded.

32. A method according to claim 29, further comprising a step of displaying a processing mode which cannot be executed when said image recording apparatus does not have the necessary structure.

* * * * *

UNITED STATES PATENT AND TRADEMARK OFFICE
CERTIFICATE OF CORRECTION

PATENT NO. : 5,784,173
DATED       : July 21, 1998
INVENTOR(S) : Shigeru Jinni

It is certified that error appears in the above-identified patent and that said Letters Patent is hereby corrected as shown below:

COLUMN 9 line 7,  "nor" should read --not--; and
line 18, "ben" should read --been--.

COLUMN 10 line 25, "a" (second occurrence) should be deleted.

Signed and Sealed this

Eighteenth Day of May, 1999

Attest:

Attesting Officer

Q. TODD DICKINSON

Acting Commissioner of Patents and Trademarks